United States Patent
Kim et al.

(10) Patent No.: US 10,848,749 B2
(45) Date of Patent: Nov. 24, 2020

(54) DISPLAY APPARATUS WITH MULTI-DIRECTION SOUND GENERATION

(71) Applicant: LG Display Co., Ltd., Seoul (KR)

(72) Inventors: Seon Man Kim, Paju-si (KR); KiDuk Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/426,355

(22) Filed: May 30, 2019

(65) Prior Publication Data

US 2019/0394450 A1 Dec. 26, 2019

(30) Foreign Application Priority Data

Jun. 26, 2018 (KR) ........................ 10-2018-0073448

(51) Int. Cl.
*H04N 13/302* (2018.01)
*G10K 11/32* (2006.01)
*G10K 11/34* (2006.01)
*H04R 1/34* (2006.01)

(52) U.S. Cl.
CPC ........... *H04N 13/302* (2018.05); *G10K 11/32* (2013.01); *G10K 11/341* (2013.01); *H04R 1/345* (2013.01); *H04R 2499/15* (2013.01)

(58) Field of Classification Search
CPC .... H04N 13/302; G10K 11/32; G10K 11/341; H04R 1/345; H04R 2499/15
USPC .................................................. 381/300, 89
See application file for complete search history.

(56) References Cited

U.S. PATENT DOCUMENTS 7,970,153 B2 *  6/2011 Konagai ................ H04R 1/403
                                                  381/102

* cited by examiner

*Primary Examiner* — Vivian C Chin
*Assistant Examiner* — Douglas J Suthers
(74) *Attorney, Agent, or Firm* — Morgan, Lewis & Bockius LLP

(57) ABSTRACT

A display apparatus includes a display panel configured to display a first image in a first direction and configured to display a second image in a second, different direction, a sound output unit including sound output modules to output a sound, and a sound focusing unit. The sound focusing unit is configured to receive first and second audio signals synchronized with video data signals of the first image and the second image, apply a direction focusing weight to the first and second audio signals, and to provide the sound output modules with a sound signal having the direction focusing weight applied thereto. Furthermore, the sound output unit is configured to receive the sound signal corresponding to the sound output modules, to output a first sound corresponding to the first image in the first direction, and to output a second sound corresponding to the second image in the second direction.

22 Claims, 9 Drawing Sheets

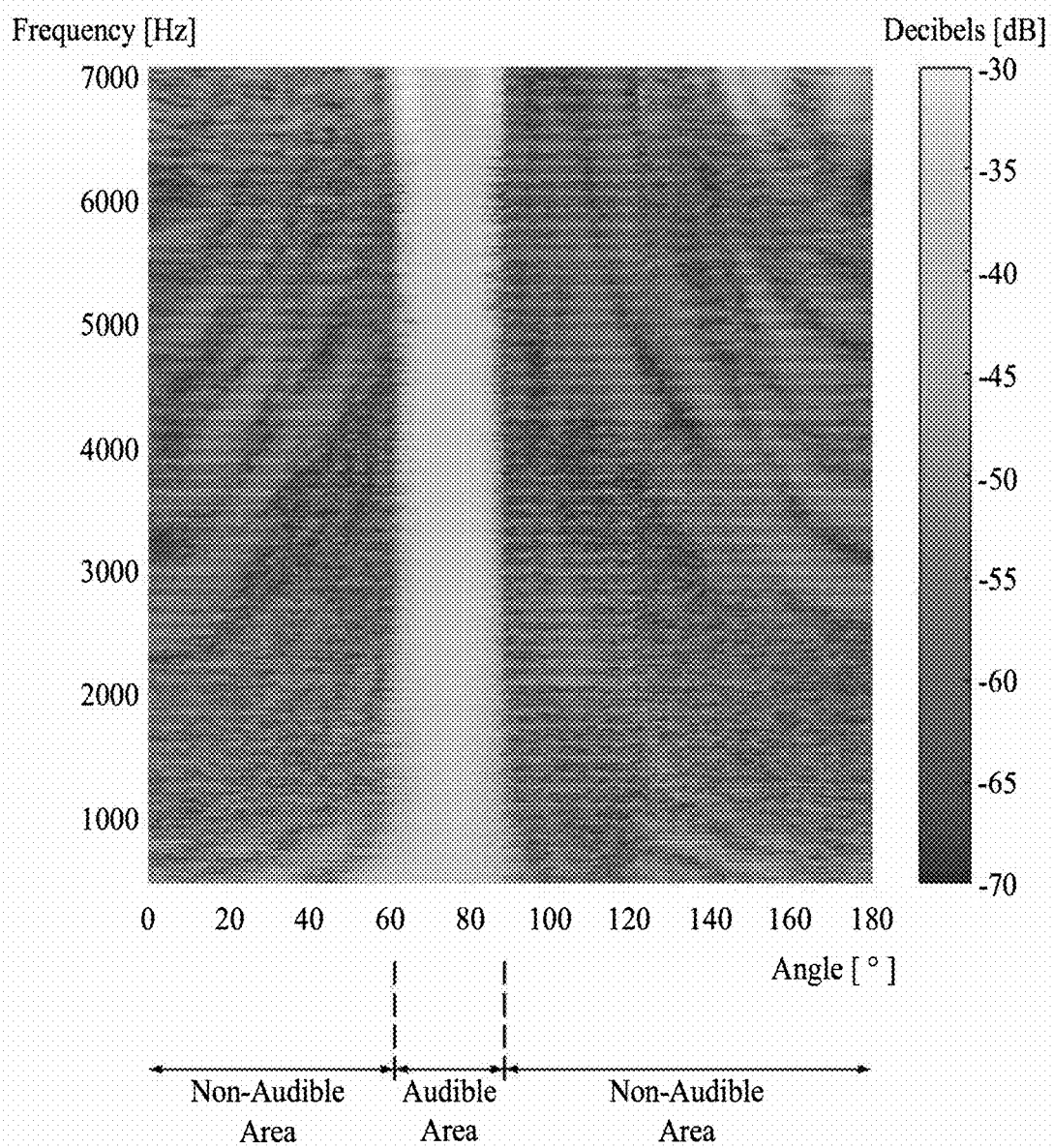

DISPLAY APPARATUS WITH MULTI-DIRECTION SOUND GENERATION

CROSS-REFERENCE TO RELATED APPLICATIONS

This application claims the benefit of Korean Patent Application No. 10-2018-0073448 filed on Jun. 26, 2018, which is hereby incorporated by reference as if fully set forth herein.

BACKGROUND

Technical Field

The present disclosure relates to a display apparatus, and more particularly, to a display apparatus for generating a sound.

Discussion of the Related Art

Recently, as information-oriented society advances, the field of display apparatuses for visually expressing electrical information signals have rapidly advanced. Various display apparatuses, having excellent performance in terms of thinness, light weight, and low power consumption, are being developed. Examples of the display apparatuses include liquid crystal display (LCD) apparatuses, field emission display (FED) apparatuses, organic light emitting display apparatuses, etc.

Display apparatuses may output a video signal to display an image on a screen of a display panel, and output an audio signal to reproduce a sound through speakers. The speakers may be implemented as an external speaker system installed outside a display apparatus, or as internal speakers disposed in the display apparatus.

Generally, based on a combination of a plurality of speakers, each speaker may adjust a direction of a sound which is to be reproduced, or may output a sound to a certain region. In this context, the sound transfer principle called directivity may allow signals to overlap one another by using a phase difference between a plurality of sound signals, to increase strength of a signal, and thus, may transfer a signal in a certain direction.

SUMMARY

Accordingly, the present disclosure is directed to a display apparatus that substantially obviates one or more problems due to limitations and disadvantages of the related art.

An aspect of the present disclosure is to provide a display apparatus which outputs a plurality of sounds respectively corresponding to a plurality of images displayed in different directions, in order for the plurality of sounds to respectively concentrate in the same directions as the plurality of images.

Another aspect of the present disclosure is to provide a display apparatus which applies a direction focusing weight to each of a plurality of audio signals synchronized with respective data of a plurality of images displayed in different directions, thereby allowing a plurality of sounds to concentrate in different directions.

The objects of the present disclosure are not limited to the aforesaid, but other objects not described herein will be clearly understood by those skilled in the art from descriptions below.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, a display apparatus comprises a display panel configured to display a first image in a first direction and configured to display a second image in a second direction, wherein the second direction is different from the first direction; a sound output unit including a plurality of sound output modules on a portion of the display panel to output a sound; and a sound focusing unit configured to receive first and second audio signals respectively synchronized with video data signals of the first image and the second image, configured to apply a direction focusing weight, corresponding to each of the plurality of sound output modules, to the first and second audio signals, and configured to provide each of the plurality of sound output modules with a sound signal having the direction focusing weight applied thereto, wherein the sound output unit is configured to receive the sound signal corresponding to each of the plurality of sound output modules, to output a first sound corresponding to the first image in the first direction, and to output a second sound corresponding to the second image in the second direction.

In another aspect, a display apparatus comprises a display panel configured to display a first image in a first direction and configured to display a second image in a second direction, wherein the second direction is different from the first direction; a sound output unit including a plurality of sound output modules on a portion of the display panel to output a sound; a sound position detector configured to detect a distance between adjacent sound output modules and an arrangement of the plurality of sound output modules; and a sound focusing unit configured to receive first and second audio signals respectively synchronized with video data signals of the first image and the second image, configured to apply a direction focusing weight, corresponding to each of the plurality of sound output modules, to the first and second audio signals, and configured to provide each of the plurality of sound output modules with a sound signal having the direction focusing weight applied thereto, wherein the sound output unit outputs a first sound corresponding to the first image in the first direction and outputs a second sound corresponding to the second image in the second direction.

The display apparatus according to the present disclosure may output each of a plurality of sounds corresponding to each of a plurality of images displayed in different directions, in order for the plurality of sounds to respectively concentrate in the same directions as the plurality of images.

Moreover, the display apparatus according to the present disclosure may apply a direction focusing weight to each of a plurality of audio signals synchronized with a respective of data of a plurality of images displayed in different directions, thereby allowing a plurality of sounds to concentrate in different directions.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings:

FIGS. 7A and 7B are graphs showing a directivity of a sound output from a display apparatus in a display apparatus according to an embodiment of the present disclosure.

DETAILED DESCRIPTION

Figure 1:
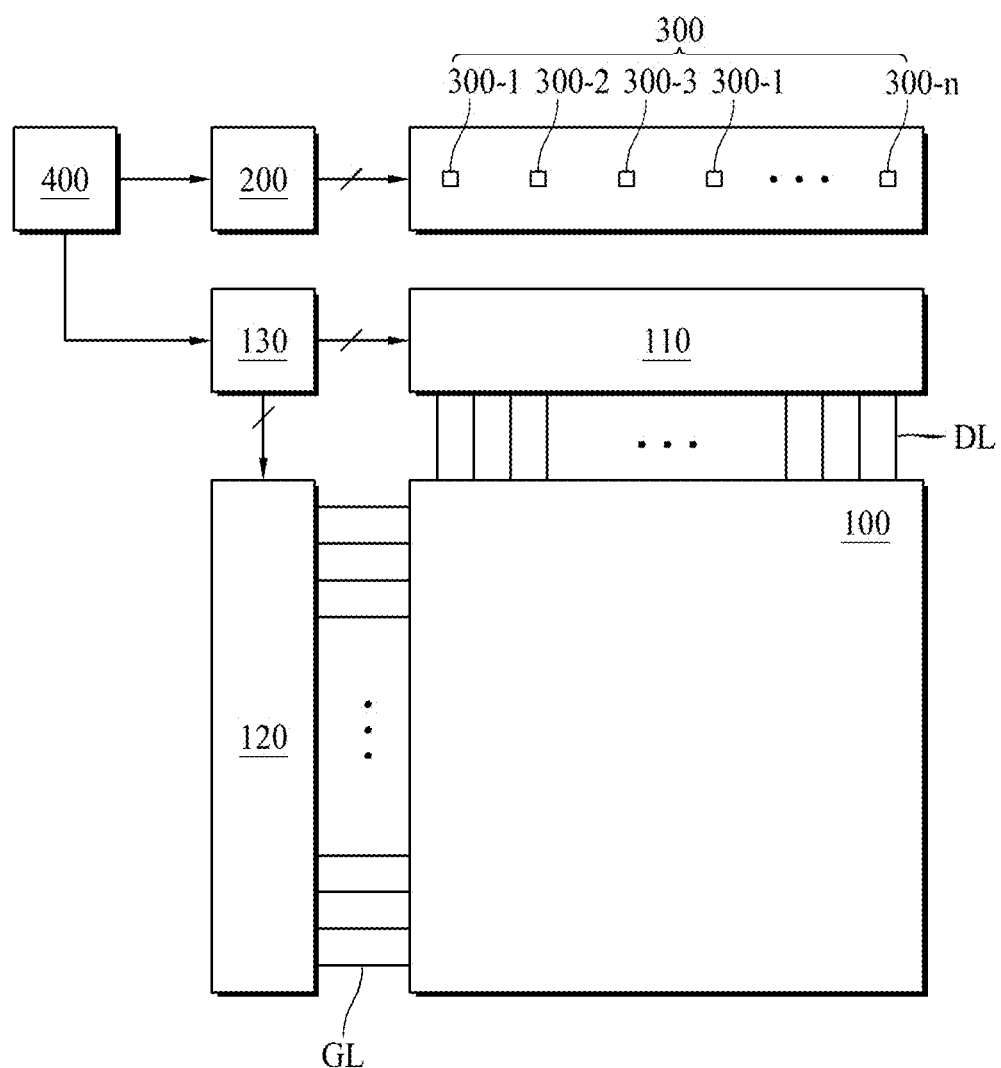
FIG. 1 is a block diagram of a display apparatus according to an embodiment of the present disclosure.

Reference will now be made in detail to embodiments of the present disclosure, examples of which are illustrated in the accompanying drawings. Wherever possible, the same reference numbers may be used throughout the drawings to refer to the same or like parts.

Advantages and features of the present disclosure, and implementation methods thereof will be clarified through following example embodiments described with reference to the accompanying drawings. The present disclosure may, however, be embodied in different forms and should not be construed as limited to the embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Unless otherwise described, like reference numerals refer to like elements throughout. In the following description, when the detailed description of the relevant known function or configuration is determined to unnecessarily obscure the important point of the present disclosure, the detailed description of such known function or configuration may be omitted. In a case where the terms "comprise," "have," and "include" described in the present specification are used, another part may be added unless a more limiting term, such as "only" is used. The terms of a singular form may include plural forms unless referred to the contrary.

In construing an element, the element is construed as including an error or tolerance range even where is no explicit description of such an error or tolerance range.

In describing a position relationship, when the temporal order is described as, for example, "on," "over," "under," and "next," one or more other parts may be disposed between the two parts unless a more limiting term, such as "just" or "direct(ly)" is used.

In describing a time relationship, when the temporal order is described as, for example, "after," "subsequent," "next," and "before," a case which is not continuous may be included unless "just," "immediate(ly)," or "direct(ly)" is used.

It will be understood that, although the terms "first," "second," etc. may be used herein to describe various elements, these elements should not be limited by these terms as they are not used to define a particular order. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. The terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to the other element or layer, but also be indirectly connected or adhered to the other element or layer with one or more intervening elements or layers "disposed" between elements or layers, unless otherwise specified.

The term "at least one" should be understood as including any and all combinations of one or more of the associated listed items. For example, the meaning of "at least one of a first item, a second item, and a third item" encompasses the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can understand. Embodiments of the present disclosure may be carried out independently from each other, or may be carried out together in a co-dependent relationship. Hereinafter, embodiments of a display apparatus according to the present disclosure will be described in detail with reference to the accompanying drawings. In adding reference numerals to elements of each of the drawings, although the same elements are illustrated in other drawings, like reference numerals may refer to like elements. In the following description, when the detailed description of the relevant known function or configuration is determined to unnecessarily obscure the important point of the present disclosure, the detailed description will be omitted.

In the present disclosure, examples of a display apparatus may include a narrow-sense display apparatus such as an organic light emitting display (OLED) module or a liquid crystal module (LCM) including a display panel and a driver for driving the display panel. Examples of the display apparatus may include a set apparatus or a set electronic apparatus, such as a notebook computer, a TV, a computer monitor, an automotive display or another type of equipment display including for vehicles, or a mobile electronic apparatus, such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set apparatus, which may be a final consumer apparatus or an application product including the LCM or the OLED module.

Depending on the case, an LCM or an OLED module including a display panel and a driver may be referred to as a narrow-sense display apparatus, and an electronic apparatus which is a final product including an LCM or an OLED module may be referred to as a set apparatus. For example, the narrow-sense display apparatus may include a display panel, such as an LCD or an OLED, and a source printed circuit board (PCB), which is a controller for driving the display panel. The set apparatus may further include a set PCB, which is a set controller electrically connected to the source PCB to overall control the set apparatus.

A display panel applied to the present embodiment may use all types of display panels, such as a liquid crystal display panel, an organic light emitting diode (OLED) display panel, and an electroluminescent display panel, but is not limited to a specific display panel. According to a present embodiment, the display panel may be vibrated by a sound generation device to output a sound. A shape and/or a size of a display panel applied to a display apparatus according to the present embodiment is not limited.

For example, if the display panel is a liquid crystal display panel, the display panel may include a plurality of gate lines, a plurality of data lines, and a plurality of pixels respectively provided in a plurality of pixel areas defined by intersections of the gate lines and the data lines. The display panel may include an array substrate including a thin film transistor (TFT), which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT, which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like).

The display panel may further include a backing such as a metal plate attached on the display panel. However, the present embodiment is not limited to the metal plate, and may include another structure.

In the present disclosure, the display panel may be applied to vehicles as a user interface module, such as a central control panel for automobiles. For example, the display panel may be provided between occupants sitting in two front seats in order for a vibration of the display panel to be transferred to the inside of a vehicle. Therefore, an audio experience in the vehicle may be improved in comparison to a case where speakers are disposed on interior sides of the vehicle.

Figure 2:
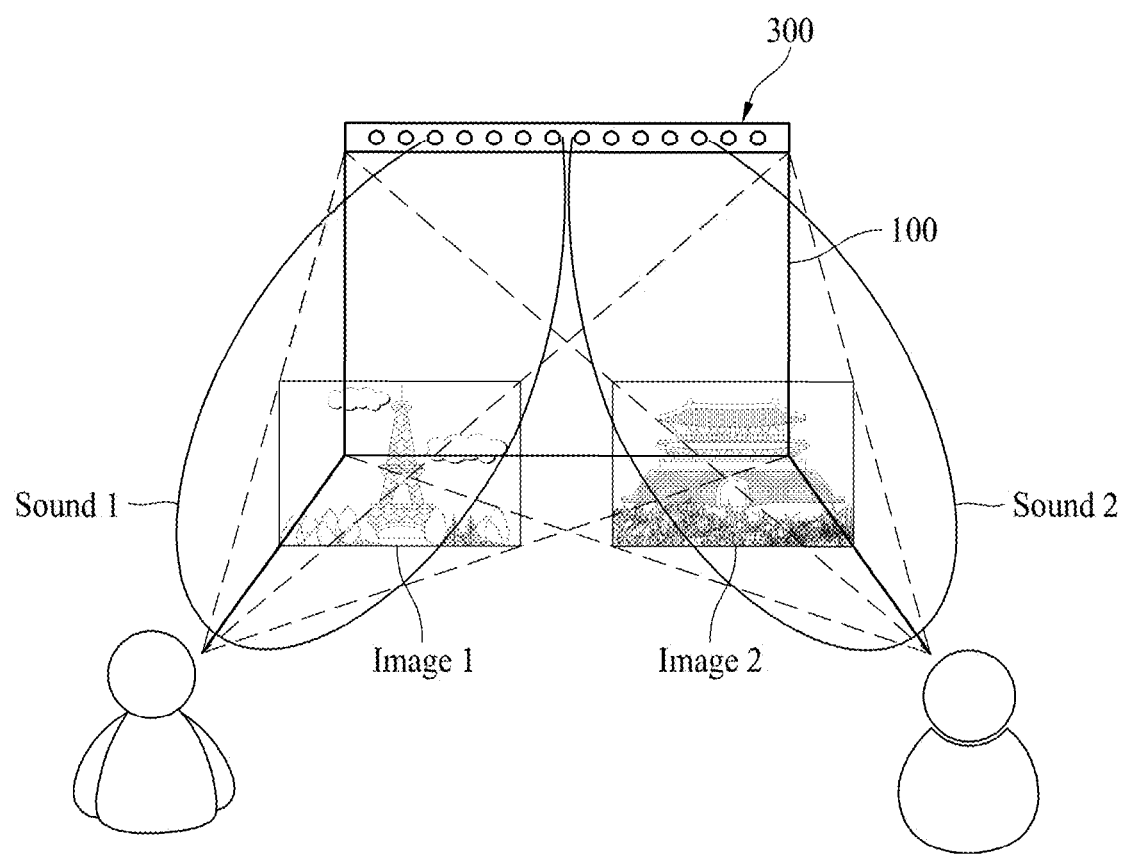
FIG. 2 illustrates a directivity of a sound output from a display apparatus in a display apparatus according to an embodiment of the present disclosure.
Figure 3:
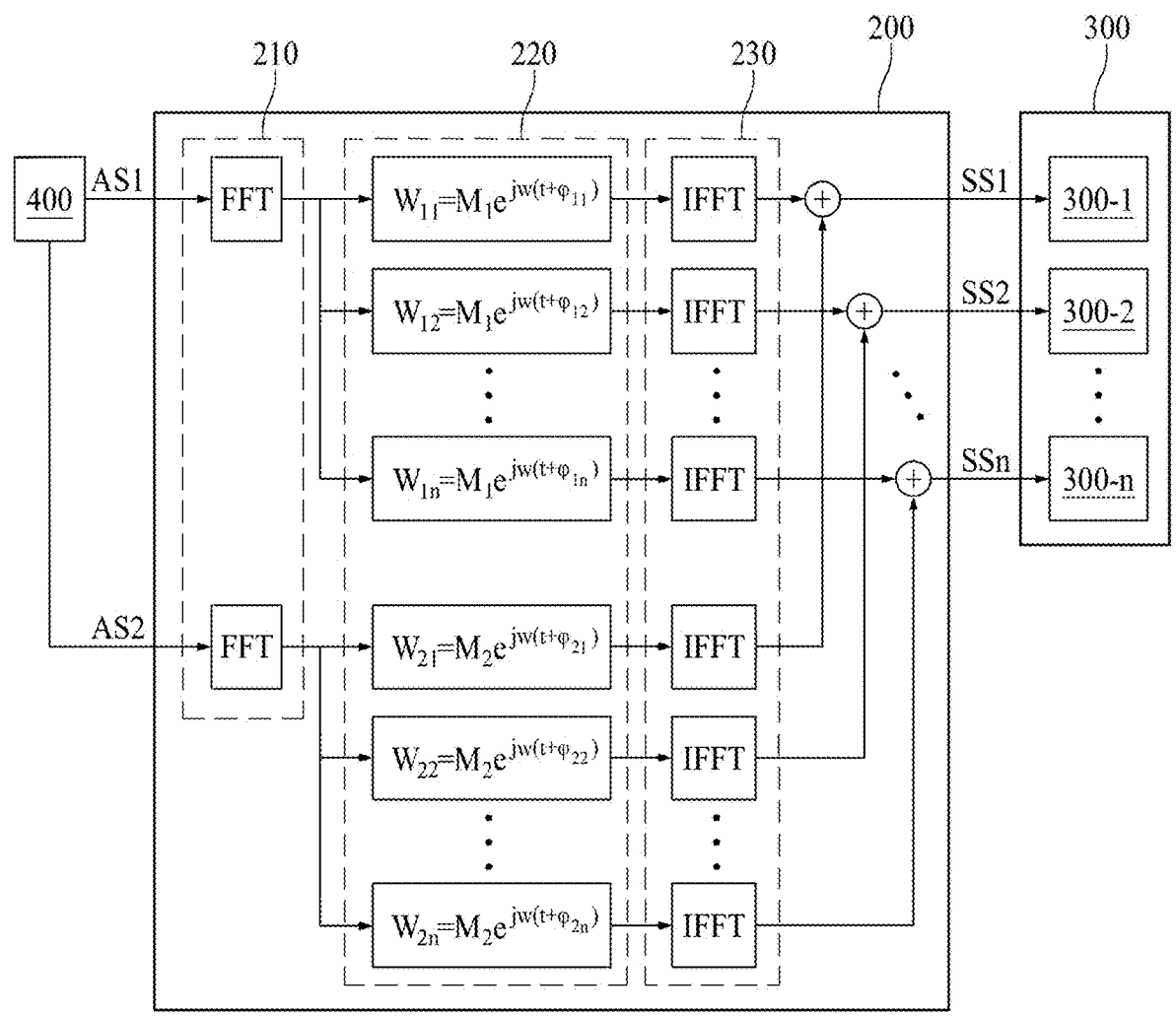
FIG. 3 illustrates a sound focusing unit of FIG. 1.

FIG. 1 is a block diagram illustrating a display apparatus according to an embodiment of the present disclosure. FIG. 2 illustrates a directivity of a sound output from a display apparatus, in a display apparatus according to an embodiment of the present disclosure. FIG. 3 illustrates a sound focusing unit of FIG. 1.

With reference to FIGS. 1 to 3, a display apparatus may include a display panel 100, a sound focusing unit 200, a sound output unit 300, and a host system 400.

The display panel 100 may be configured to display an image, and may be implemented as any type of display panel, such as a liquid crystal display panel, an organic light emitting diode (OLED) display panel, and an electroluminescent display panel.

The display panel 100 may include a pixel array, which displays an image on the basis of video data. The pixel array may include a plurality of pixels, which are respectively in a plurality of pixel areas by intersections of a plurality of data lines DL and a plurality of gate line GL and are arranged in a matrix form. Each of the plurality of pixels may include a red subpixel, a green subpixel, and a blue subpixel, for realizing colors. Also, each of the plurality of pixels may further include a white subpixel.

The display apparatus may further include a panel driving circuit for driving the display panel 100. The panel driving circuit may include a data driver 110, a gate driver 120, and a timing controller 130.

The data driver 110 may be connected to the timing controller 130 and the plurality of data lines DL. For example, the data driver 110 may receive a video data signal corresponding to an input image from the timing controller 130, convert the video data signal into a data voltage, and provide the data voltage to a corresponding data line of the plurality of data line DL.

The gate driver 120 may be connected to the timing controller 130 and the plurality of data lines DL. The gate driver 120 may receive a gate start pulse, synchronized with the video data signal, from the timing controller 130 and may sequentially provide a gate pulse to the plurality of gate lines GL.

The timing controller 130 may receive a video data signal of the input image and timing signals synchronized with the video data signal of the input image from a host system 400. Here, the timing signals may include a vertical synchronization signal Vsync, a horizontal synchronization signal Hsync, a data enable signal DE, a dot clock DCLK, etc. The timing controller 130 may convert the video data signal into the data voltage to provide the data voltage to the data driver 110 and may provide the timing signals Vsync, Hsync, DE, and DCLK to the gate driver 120, thereby controlling an operation timing of each of the data driver 110 and the gate driver 120.

With reference to FIG. 2, the display panel 100 may display a first image (Image 1) in a first direction and may display a second image (Image 2) in a second direction different from the first direction.

According to an embodiment, the display panel 100 may include the plurality of pixels, a transparent layer on the plurality of pixels, and a mesh on the transparent layer. Each of the plurality of pixels may display the first image (Image 1) or the second image (Image 2), and the first image (Image 1) and the second image (Image 2) may be displayed in the first direction or the second direction by using the mesh spaced apart from the plurality of pixels by a certain distance by the transparent layer. Here, a structure of the display panel 100 is not limited thereto, and the display panel 100 may be implemented as various display panels for displaying a plurality of images in different directions.

For example, the display panel 100 may be implemented as an in-vehicle display. In this case, the display panel 100 may provide different images to passengers in different seats of a vehicle. For example, the first image (Image 1) may be displayed to a driver, and the second image (Image 2) may be displayed to a person in a passenger seat or another seat. Therefore, in the display apparatus according to embodiments of the present disclosure, it may not be required to provide an individual display to each passenger. Thus, the display disposition cost may be reduced, and space may be efficiently used.

With reference to FIGS. 1 and 3, the sound focusing unit 200, which may be embodied in circuitry, may receive first and second audio signals AS1 and AS2 respectively synchronized with video data signals of the first image (Image 1) and the second image (Image 2) to apply a direction focusing weight, corresponding to each of a plurality of sound output modules 300-1 to 300-n, to each of the first and second audio signals AS1 and AS2, and may respectively provide the plurality of sound output modules 300-1 to 300-n with sound signals SS1 to SSn with the direction focusing weight applied thereto.

For example, the sound focusing unit 200 may receive the first audio signal AS1 synchronized with the video data signal of the first image (Image 1) to apply a first direction focusing weight, corresponding to each of the plurality of sound output modules 300-1 to 300-n, to the first audio signal AS1, and may receive the second audio signal AS2 synchronized with the video data signal of the second image (Image 2) to apply a second direction focusing weight, corresponding to each of the plurality of sound output modules 300-1 to 300-n, to the second audio signal AS2.

The sound focusing unit 200 may include a frequency domain conversion module 210, a weight application module 220, and a time domain conversion module 230.

The frequency domain conversion module 210 may receive the first and second audio signals AS1 and AS2 and may perform a Fast Fourier Transform (FFT) to convert the first and second audio signals AS1 and AS2 into signals of a frequency band. The frequency domain conversion module 210 may provide the weight application module 220 with the first and second audio signals AS1 and AS2 of the frequency band. Here, an operation of performing, by the frequency domain conversion module 210, the FFT on each of the first and second audio signals AS1 and AS2 may correspond to an operation of applying the direction focusing weight to the first and second audio signals AS1 and AS2. Therefore, the present embodiment is not limited to the FFT, and the frequency domain conversion module 210 may convert each of the first and second audio signals AS1 and AS2 into a signal of a frequency band, for applying the direction focusing weight.

The weight application module 220 may convolute a phase pulse adjusted differently for each of the plurality of sound output modules 300-1 to 300-n to each of the first and second audio signals, thereby respectively applying the first and second direction focusing weights to the first and second audio signals AS1 and AS2 of the frequency band. In detail, the weight application module 220 may determine or adjust the first and second direction focusing weights, based on a distance between adjacent sound output modules, the arrangement of the plurality of sound output modules 300-1 to 300-n, and the first and second directions in which an image is to be displayed.

For example, the weight application module 220 may apply the first direction focusing weight so that sounds output from the plurality of sound output modules 300-1 to 300-n cause constructive interference in the first direction and cause destructive interference in a direction other than the first direction, based on the first audio signal AS1, and may apply the second direction focusing weight so that the sounds output from the plurality of sound output modules 300-1 to 300-n cause constructive interference in the second direction and cause destructive interference in a direction other than the second direction, based on the second audio signal AS2. Therefore, a phase pulse of each of the first and second direction focusing weights may be determined or adjusted in a direction in which the sounds output from the plurality of sound output modules 300-1 to 300-n cause constructive interference and destructive interference.

According to an embodiment, the sound output unit 300 may include n (where n is a natural number equal to or more than two) number of sound output modules 300-1 to 300-n, and the weight application module 220 may apply direction focusing weights W11 to W1n and W21 to W2n, determined for each of the n sound output modules 300-1 to 300-n as expressed in the following Equation, to each of the first and second audio signals AS1 and AS2.

$$W_{11} = M_1 e^{jw(t+\varphi 11)} \quad W_{21} = M_2 e^{jw(t+\varphi 21)}$$
$$W_{12} = M_1 e^{jw(t+\varphi 12)} \quad W_{22} = M_2 e^{jw(t+\varphi 22)}$$
$$W_{13} = M_1 e^{jw(t+\varphi 13)} \quad W_{23} = M_2 e^{jw(t+\varphi 23)}$$
$$\vdots \quad \vdots$$
$$W_{1n} = M_1 e^{jw(t+\varphi 1n)} \quad W_{2n} = M_2 e^{jw(t+\varphi 2n)}$$
[Equation]

Here, $W_{1k}$ may be a first direction focusing weight, corresponding to a kth (where k is a natural number from one to n) sound output module 300-k, of the first audio signal AS1, and $W_{2k}$ may be a second direction focusing weight, corresponding to the kth sound output module 300-k, of the second audio signal AS2. Also, $M_1$ may be amplitude of the first direction focusing weight, and $M_2$ may be amplitude of the second direction focusing weight. Furthermore, $\varphi 1k$ may be a time shift, corresponding to the kth sound output module 300-k, of the first audio signal AS1, and $\varphi 2k$ may be a time shift, corresponding to the kth sound output module 300-k, of the second audio signal AS2.

Therefore, the weight application module 220 may receive the first and second audio signals AS1 and AS2, and may apply the first and second direction focusing weights, corresponding to each of the plurality of sound output modules 300-1 to 300-n, to the first and second audio signals AS1 and AS2 by convoluting a phase pulse determined or adjusted differently based on a distance between adjacent sound output modules, the arrangement of the plurality of sound output modules 300-1 to 300-n, and the first and second directions in which an image is to be displayed. Also, the weight application module 220 may respectively provide the plurality of sound output modules 300-1 to 300-n with sound signals SS1 to SSn with the first and second direction focusing weights applied thereto.

The time domain conversion module 230 may receive a frequency component, to which the first and second direction focusing weights are applied, from the weight application module 220 and may perform an Inverse Fast Fourier Transform (IFFT) to generate a signal of the time domain. Therefore, each of the first and second sound signals AS1 and AS2 may sequentially pass through the frequency domain conversion module 210, the weight application module 220, and the time domain conversion module 230, and the first and second direction focusing weights may be applied to the first and second sound signals AS1 and AS2. Here, an operation of performing, by the time domain conversion module 230, the IFFT to convert a frequency component with the first and second direction focusing weights applied thereto into a time domain may correspond to an operation of performing an inverse transform of the FFT performed by the frequency domain conversion module 210. Therefore, in a case where the frequency domain conversion module 210 converts each of the first and second sound signals AS1 and AS2 into a signal of a frequency band by using a method other than the FFT, the frequency domain conversion module 210 may generate a signal of the time domain through an inverse transform of a transform performed by the frequency domain conversion module 210.

The sound focusing unit 200 may merge signals of the time domain, to which the first and second direction focusing weights are applied, to generate the sound signals SS1 to SSn respectively corresponding to the plurality of sound output modules 300-1 to 300-n. For example, the sound focusing unit 200 may respectively apply the first and second direction focusing weights to the first and second sound signals AS1 and AS2 and may merge or combine the first and second sound signals AS1 and AS2 to generate the sound signals SS1 to SSn respectively corresponding to the plurality of sound output modules 300-1 to 300-n. Therefore, each of the sound signals SS1 to SSn may include information about the first and second sound signals AS1 and AS2, and thus, while a plurality of images are being displayed in different directions, the display apparatus may output a plurality of sounds respectively corresponding to the plurality of images so as to allow the plurality of sounds to concentrate in the same directions as the plurality of images.

Therefore, the sound focusing unit 200 may respectively provide the plurality of sound output modules 300-1 to 300-n with sound signals SS1 to SSn with the first and second direction focusing weights applied thereto while the display panel 100 is displaying the first image (Image 1) and the second image (Image 2) in the first direction and the second direction. Thus, the sound output unit 300 may output a first sound (Sound 1) corresponding to the first image (Image 1) in the first direction and may output a second sound (Sound 2) corresponding to the second image (Image 2) in the second direction. Accordingly, in the display apparatus according to the present disclosure, a separate sound output unit may not be needed for providing the first sound (Sound 1) and the second sound (Sound 2) respectively corresponding to the first image (Image 1) and the second image (Image 2), the disposition cost of the sound output unit 300 may be reduced, and a space may be efficiently used.

Moreover, in the display apparatus according to the present disclosure, because each of the sound signals SS1 to SSn respectively provided to the plurality of sound output modules 300-1 to 300-n includes the information about the each of the first and second sound signals AS1 and AS2, a sound pressure level (SPL) and direction focusing efficiency may be more enhanced than a case where the plurality of sound output modules 300-1 to 300-n includes sound data of one of the first sound (Sound 1) and the second sound (Sound 2).

The sound output unit 300 may include the plurality of sound output modules 300-1 to 300-n, which are arranged on one portion of the display panel and output sounds. The plurality of sound output modules 300-1 to 300-n may be arranged in one row in a periphery of the display panel 100. For example, adjacent sound output modules of the plurality of sound output modules 300-1 to 300-n may maintain the same interval or distance therebetween.

According to an embodiment, the sound output unit 300 may be disposed on an upper portion of the display panel 100, but is not limited thereto. For example, the sound output unit 300 may be disposed on a right portion, a left portion, or a lower portion of the display panel 100 and may be disposed to overlap the display panel 100.

While the first image (Image 1) is being displayed in the first direction and the second image (Image 2) is being displayed in the second direction, the sound output unit 300 may output the first sound (Sound 1) corresponding to the first image (Image 1) in the first direction and may output the second sound (Sound 2) corresponding to the second image (Image 2) in the second direction.

According to an embodiment, the plurality of sound output modules 300-1 to 300-n may respectively receive first to nth sound signals SS1 to SSn, where information about the first audio signal AS1 is merged or combined with information about the second audio signal AS2. Here, each of the first to nth sound signals SS1 to SSn may correspond to a signal where (a) a signal of a time domain to which the first direction focusing weight is applied based on the first audio signal AS1 is merged with (b) a signal of a time domain to which the second direction focusing weight is applied based on the second audio signal AS2. In this case, sounds output from the plurality of sound output modules 300-1 to 300-n may cause constructive interference and destructive interference, based on the first and second direction focusing weights. Therefore, the sound output unit 300 may output the first sound (Sound 1) corresponding to the first image (Image 1) in the first direction and may output the second sound (Sound 2) corresponding to the second image (Image 2) in the second direction. Also, the sound output unit 300 may output the first sound (Sound 1) and the second sound (Sound 2) so as to reduce and possibly minimize a sound pressure level which is transferred in a direction other than the first and second directions.

According to an embodiment, the sound output unit 300 may output the first sound (Sound 1) in a front left direction with respect to a front surface of the display panel 100, and the second sound output module 202 may output the second sound (Sound 2) in a front right direction with respect to the front surface of the display panel 100. Therefore, the sound output unit 300 may provide the first sound (Sound 1) to only a viewer or user who is watching the first image (Image 1) at a front left position with respect to the display panel 100, and may provide the second sound (Sound 2) to only a viewer or user who is watching the second image (Image 2) at a front right position with respect to the display panel 100. For example, the first sound may correspond to a navigation sound of a vehicle, and the second sound may correspond to an entertainment sound, a music sound, or a DMB sound of the vehicle.

The host system 400 may be one of a television (TV) system, a set-top box, a navigation system, a DVD player, a blu-ray player, a personal computer (PC), a home theater system, and a phone system, but is not limited thereto. The host system 110 may provide the timing controller 140 with a video data signal of an input image and timing signals synchronized with the video data signal, and may provide the sound focusing unit 200 with an audio signal synchronized with the video data signal.

Figure 4A:
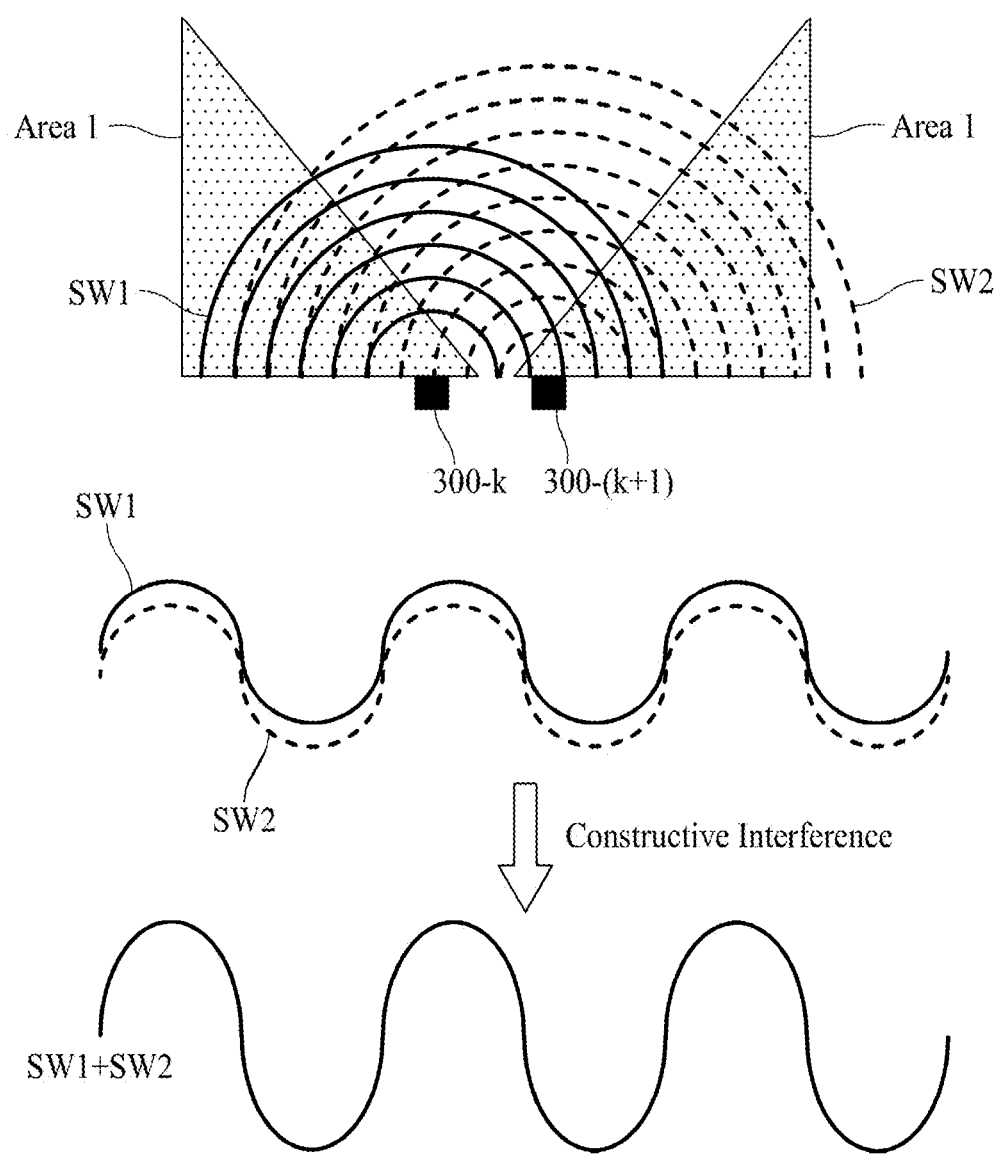
FIGS. 4A and 4B illustrate constructive interference and destructive interference of a sound in a display apparatus according to an embodiment of the present disclosure.
Figure 4B:
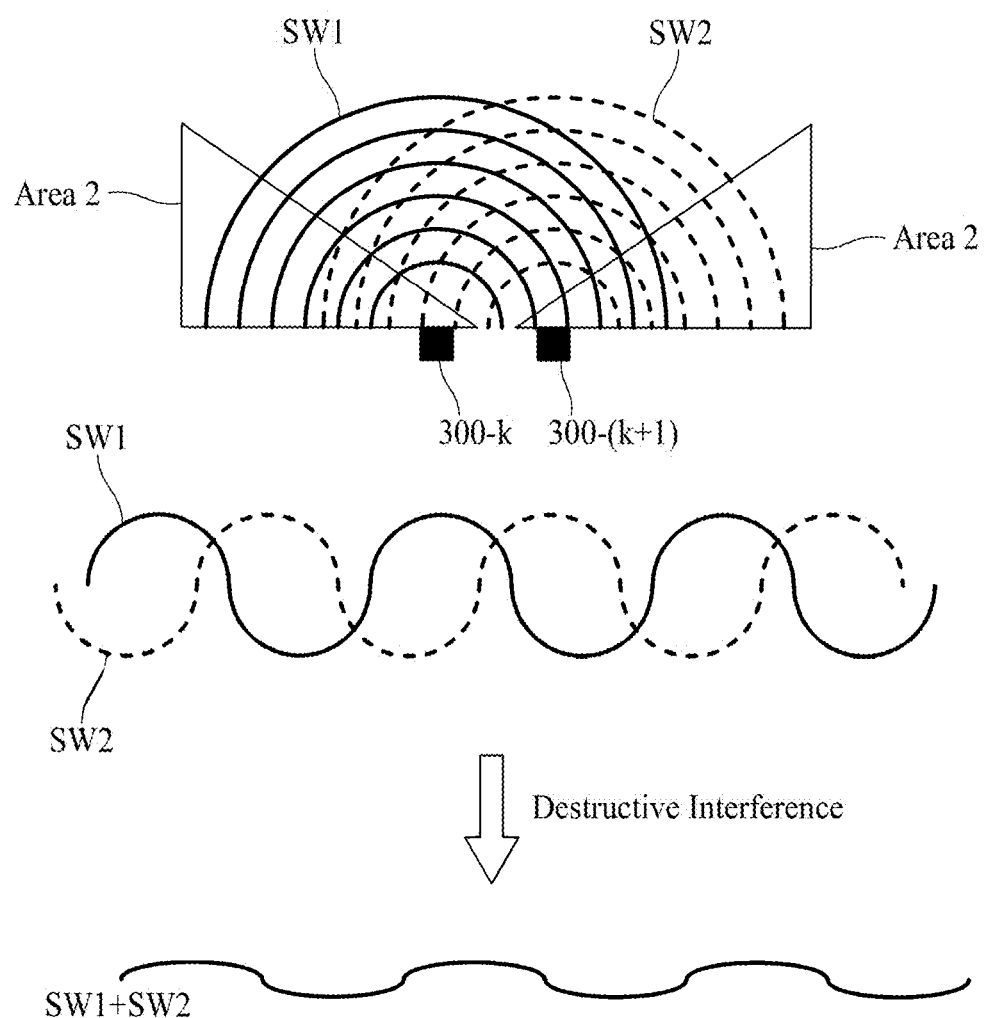

FIG. 4A illustrates constructive interference of a sound in a display apparatus according to an embodiment of the present disclosure. FIG. 4B illustrates destructive interference of the sound in the display apparatus according to an embodiment of the present disclosure.

With reference to FIGS. 4A and 4B, each of the plurality of sound output modules 300-1 to 300-*n* may output a sound wave or sound having a frequency. Here, the frequency of the sound wave may be determined or adjusted based on the number of vibrations of the sound wave, output from each of the plurality of sound output modules 300-1 to 300-*n*, per unit time. According to an embodiment, sound waves from each of the plurality of sound output modules 300-1 to 300-*n* may cause interference therebetween.

For example, in a case where a kth (where k is a natural number from one to n−1) sound output module 300-*k* may output a first sound wave SW1 and a k+1th sound output module 300-(*k*+1) adjacent to the kth sound output module 300-*k* may output a second sound wave SW2, the first and second sound waves SW1 and SW2 may be combined to cause constructive interference and destructive interference. Here, when constructive interference occurs between the first and second sound waves SW1 and SW2, amplitude of a combined sound wave may correspond to a sum of amplitudes of the first and second sound waves SW1 and SW2. On the other hand, when destructive interference occurs between the first and second sound waves SW1 and SW2, the amplitude of the combined sound wave may correspond to a difference between the amplitudes of the first and second sound waves SW1 and SW2.

For example, a first area (Area 1) of FIG. 4A corresponds to an area where the first and second sound waves SW1 and SW2 cause constructive interference therebetween, and a second area (Area 2) of FIG. 4B corresponds to an area where the first and second sound waves SW1 and SW2 cause destructive interference therebetween. Therefore, in the first area (Area 1) of FIG. 4A, the first and second sound waves SW1 and SW2 may cause the constructive interference therebetween, and a sound may be intensively transferred, and thus, a sound pressure level may be increased and possibly maximized. In the second area (Area 2) of FIG. 4B, the first and second sound waves SW1 and SW2 may cause the destructive interference therebetween, and a sound may not be transferred, and thus, a sound pressure level may be reduced and possibly minimized. Therefore, each of the plurality of sound output modules 300-1 to 300-*n* may increase and possibly maximize a sound pressure level of the first area (Area 1), and may reduce and possibly minimize a sound pressure level of the second area (Area 2) through constructive interference and destructive interference between sound waves, thereby allowing a sound to concentrate in specific directions.

The sound focusing unit 200 may determine or adjust constructive interference or destructive interference between sound waves output from each of the plurality of sound output modules 300-1 to 300-*n*, and thus, may enhance a sound pressure level of the first sound (Sound 1) output in the first direction in which the first image (Image 1) is displayed and a sound pressure level of the second sound (Sound 2) output in the second direction in which the second image (Image 2) is displayed. Also, the sound focusing unit 200 may cause destructive interference between sound waves output in a direction in which the first image (Image 1) and the second image (Image 2) are not displayed, and thus, may decrease and possibly minimize a sound pressure level of a sound output in the direction in which the first image (Image 1) and the second image (Image 2) are not displayed, thereby enhancing the direction focusing efficiency of each of the first sound (Sound 1) and the second sound (Sound 2).

Moreover, whether the first and second sound waves SW1 and SW2 cause constructive interference or destructive interference may be determined or adjusted based on a phase of each of the first and second sound waves SW1 and SW2. Therefore, the sound focusing unit 200 may convolute a phase pulse determined or adjusted differently for each of the plurality of sound output modules 300-1 to 300-*n* to each of the first and second audio signals AS1 and AS2, so that the sound focusing unit 200 determines constructive interference or destructive interference between the sound waves output from the plurality of sound output modules 300-1 to 300-*n*. Therefore, the sound focusing unit 200 may determine the first and second direction focusing weights based on a distance between adjacent sound output modules, the arrangement of the plurality of sound output modules 300-1 to 300-*n*, and the first and second directions in which an image is to be displayed, thereby enhancing a sound pressure level of the first sound (Sound 1) output in the first direction and a sound pressure level of the second sound (Sound 2) output in the second direction, and decreasing and possibly minimizing a sound pressure level of a sound output in a direction other than the first and second directions.

Figure 5:
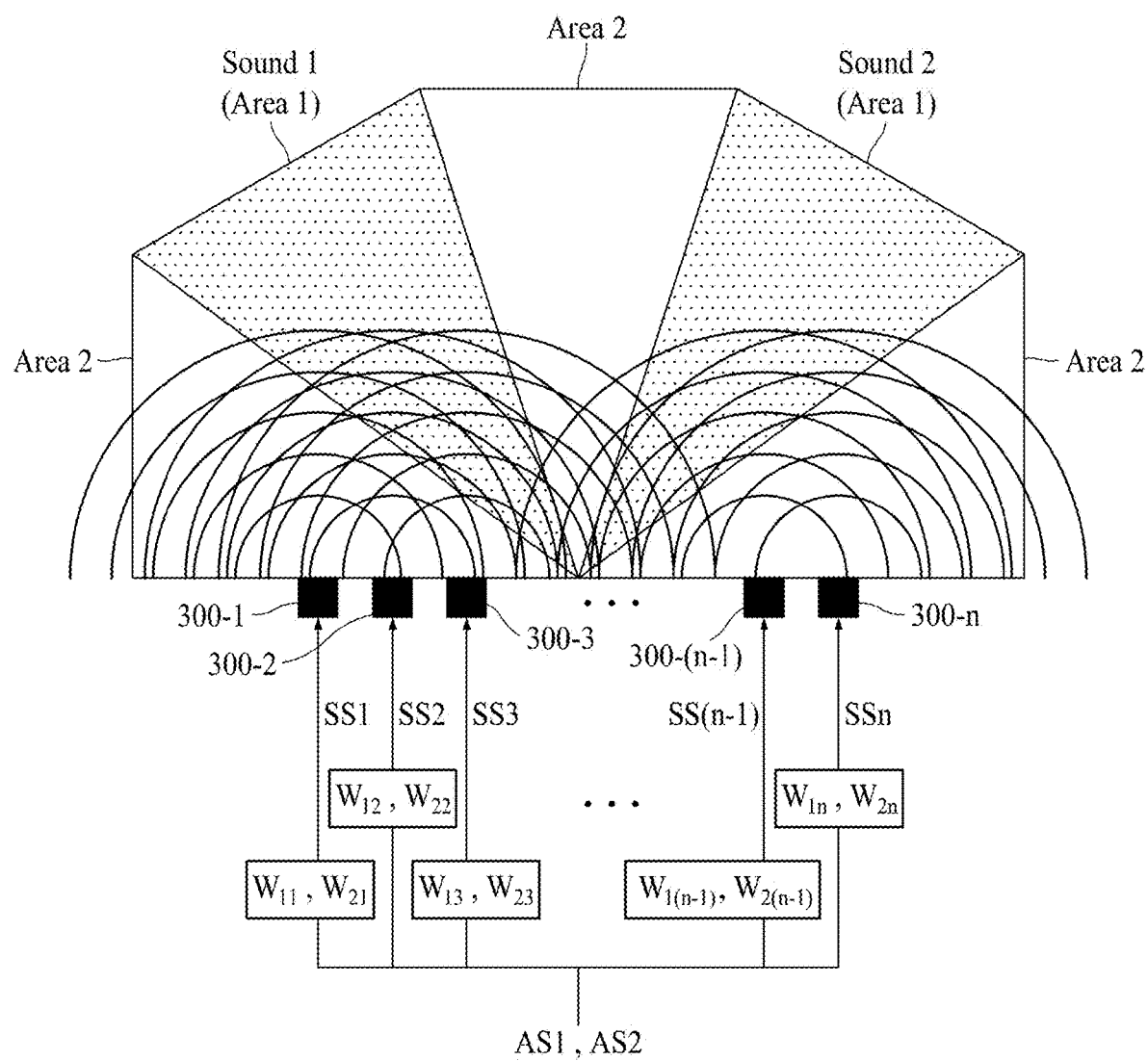
FIG. 5 illustrates a directivity of a sound based on constructive interference and destructive interference of the sound in a display apparatus according to an embodiment of the present disclosure.

FIG. 5 illustrates a directivity of a sound based on constructive interference and destructive interference of the sound, in a display apparatus according to an embodiment of the present disclosure.

With reference to FIG. 5, the plurality of sound output modules 300-1 to 300-*n* may respectively receive first to nth sound signals SS1 to SSn where information about the first audio signal AS1 is merged or combined with information about the second audio signal AS2. Here, each of the first to nth sound signals SS1 to SSn may correspond to a combined signal including both a signal of a time domain to which first direction focusing weights $W_{11}$ to $W_{1n}$ are applied to the first audio signal AS1, and a signal of a time domain to which second direction focusing weights $W_{21}$ to $W_{2n}$ are applied to the second audio signal AS2. In this case, sounds output from each of the plurality of sound output modules 300-1 to 300-*n* may cause constructive interference and destructive interference, based on the first and second direction focusing weights $W_{11}$ to $W_{1n}$ and $W_{21}$ to $W_{2n}$.

According to an embodiment, when the plurality of sound output modules 300-1 to 300-*n* output sound waves on the basis of the first to nth sound signals SS1 to SSn, the sound waves may be combined to cause constructive interference and destructive interference. Here, when constructive interference occurs between the sound waves, a sound pressure level may be enhanced, and when destructive interference occurs between the sound waves, a sound pressure level may be lowered. For example, a first area (Area 1) corresponds to an area where the sound waves cause constructive interference therebetween, and a second area (Area 2) corresponds to an area where the sound waves cause destructive interference therebetween. Therefore, in the first area (Area 1), the sound waves output from the plurality of sound output modules 300-1 to 300-*n* may cause the constructive interference therebetween, and a sound may be intensively transferred, and thus, a sound pressure level may be increased and possibly maximized. In the second area (Area 2), the sound waves output from the plurality of sound output modules 300-1 to 300-n may cause the destructive interference therebetween, and a sound may not be transferred, and thus, a sound pressure level may be reduced and possibly minimized. Therefore, each of the plurality of sound output modules 300-1 to 300-n may increase and possibly maximize a sound pressure level of the first area (Area 1) and may reduce and possibly minimize a sound pressure level of the second area (Area 2) through constructive interference and destructive interference between sound waves, thereby allowing a sound to concentrate in specific directions.

Therefore, the sound output unit 300 may output the first sound (Sound 1) corresponding to the first image (Image 1) in the first direction and may output the second sound (Sound 2) corresponding to the second image (Image 2) in the second direction. Also, the sound output unit 300 may output the first sound (Sound 1) and the second sound (Sound 2) so as to reduce and possibly minimize a sound pressure level which is transferred in a direction other than the first and second directions.

Figure 6:
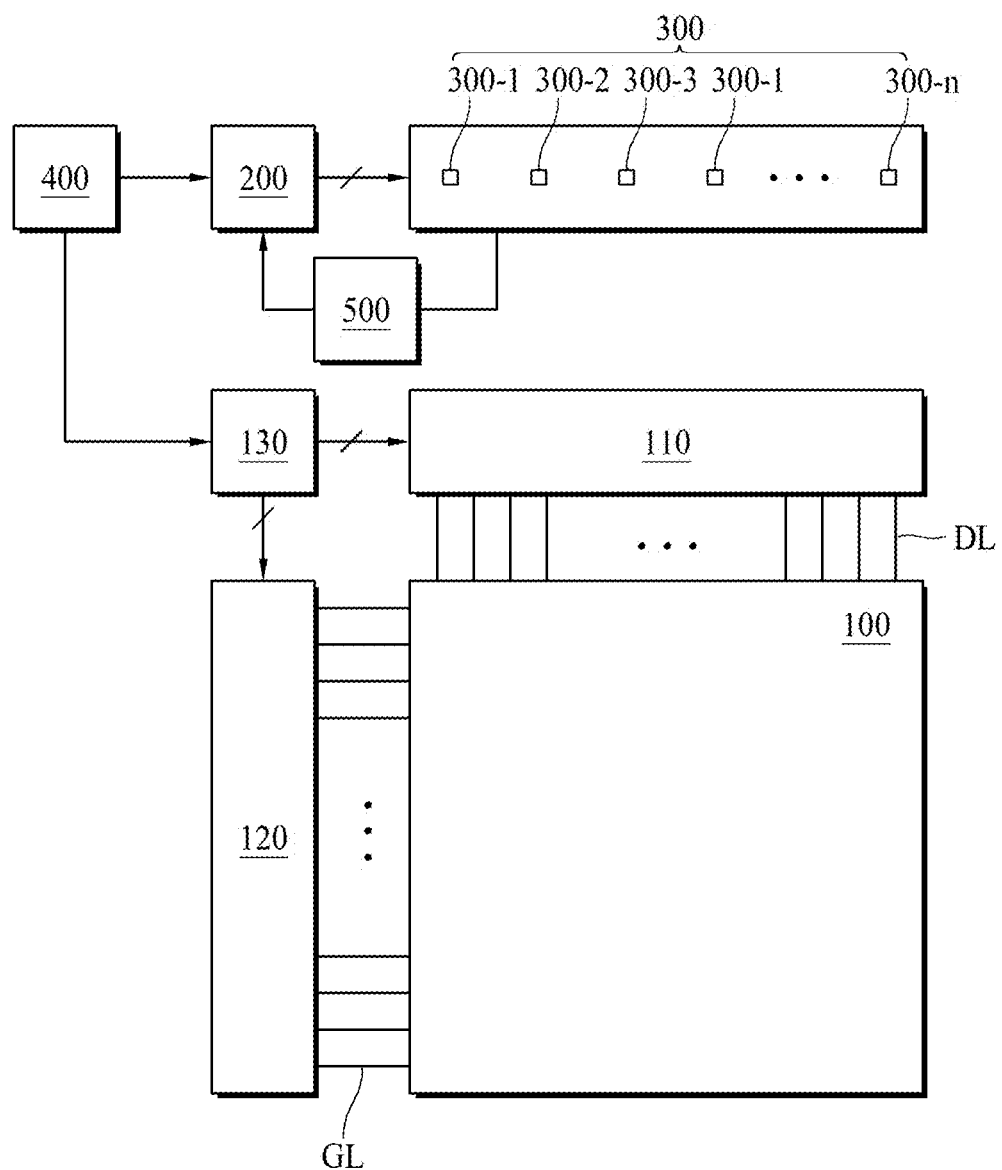
FIG. 6 is a block diagram of a display apparatus according to another embodiment of the present disclosure.

FIG. 6 is a block diagram illustrating a display apparatus according to another embodiment of the present disclosure. The display apparatus of FIG. 6 includes a sound position detector 500, and the same elements as the above-described elements of FIG. 1 are not described or will be briefly described below.

With reference to FIG. 6, the display apparatus may include a display panel 100, a sound focusing unit 200, a sound output unit 300, a host system 400, and a sound position detector 500. The display panel 100, the sound focusing unit 200, the sound output unit 300, and the host system 400 are as described above.

The sound position detector 500 may detect a distance between adjacent sound output modules and the arrangement of a plurality of sound output modules 300-1 to 300-n. For example, the sound position detector 500 may detect position information about each of the plurality of sound output modules 300-1 to 300-n and may calculate a distance between adjacent sound output modules and the arrangement of the plurality of sound output modules 300-1 to 300-n by using a predetermined algorithm. Also, the sound position detector 500 may provide the sound focusing unit 200 with distance and arrangement information about the plurality of sound output modules 300-1 to 300-n.

The sound focusing unit 200 may receive the distance and arrangement information about the plurality of sound output modules 300-1 to 300-n from the sound position detector 500 and may determine a phase pulse corresponding to each of the plurality of sound output modules 300-1 to 300-n, thereby determining first and second direction focusing weights. Therefore, because the display apparatus further includes the sound position detector 500, even when a position of each of the plurality of sound output modules 300-1 to 300-n is changed, the display apparatus may apply the first and second direction focusing weights corresponding to a changed position to output first and second sounds (Sound 1) and (Sound 2) respectively corresponding to first and second images (Image 1) and (Image 2).

Figure 7B:
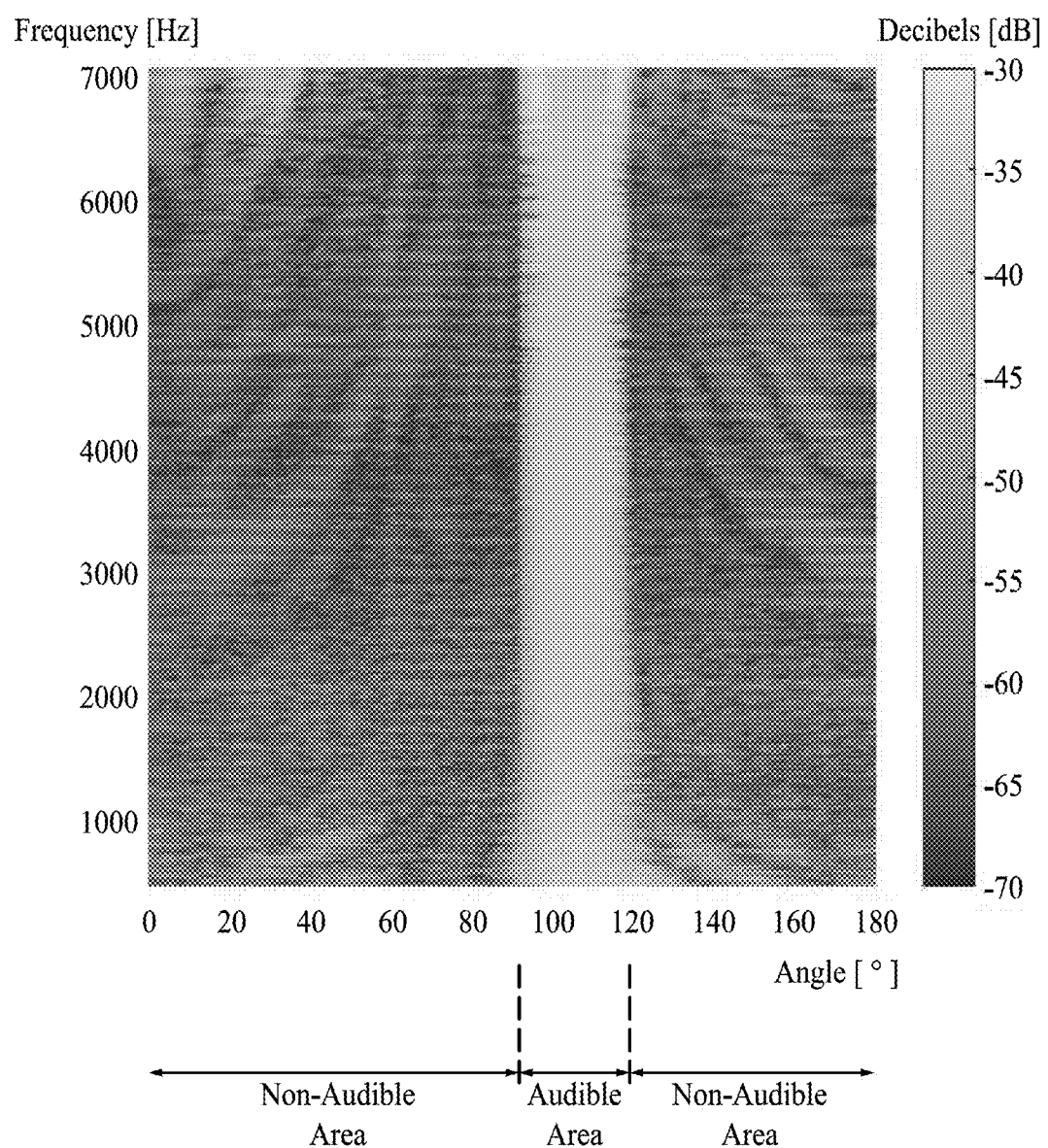

FIGS. 7A and 7B are graphs showing a directivity of a sound output from a display apparatus, in a display apparatus according to an embodiment of the present disclosure. Here, FIG. 7A shows a directivity of a first sound (Sound 1), and FIG. 7B shows a directivity of a second sound (Sound 2). FIGS. 7A and 7B show results obtained by separately measuring the directivity of the first sound (Sound 1) and the directivity of the second sound (Sound 2) so as to clearly show the directivity of these two sounds. Even when a plurality of sounds are simultaneously measured, the present disclosure may obtain a desired result.

With reference to FIG. 7A, the display apparatus may enhance a sound pressure level of the first sound (Sound 1) corresponding to a first image (Image 1) in a direction corresponding to an angle of about 60 degrees to about 80 degrees, and may decrease the sound pressure level of the first sound (Sound 1) corresponding to the first image (Image 1) in a direction corresponding to an angle of about 0 degrees to about 60 degrees and about 80 degrees to about 180 degrees, with respect to a display surface of the display panel 100. The display apparatus may apply a first direction focusing weight, corresponding to each of the plurality of sound output modules 300-1 to 300-n, to the first audio signal AS1 so that the sound pressure level of the first sound (Sound 1) is increased and possibly maximized in a direction corresponding to an angle of about 60 degrees to about 80 degrees with respect to a forward region in front of the display panel 100. Therefore, the display apparatus may output a sound having directivity through constructive interference and destructive interference between sound waves output from the plurality of sound output modules 300-1 to 300-n.

With reference to FIG. 7B, the display apparatus may enhance a sound pressure level of the second sound (Sound 2) corresponding to a second image (Image 2) in a direction corresponding to an angle of about 100 degrees to about 120 degrees, and may decrease the sound pressure level of the second sound (Sound 2) corresponding to the second image (Image 2) in a direction corresponding to an angle of about 0 degrees to about 100 degrees and about 100 degrees to about 180 degrees, with respect to the display surface of the display panel 100. The display apparatus may apply a second direction focusing weight, corresponding to each of the plurality of sound output modules 300-1 to 300-n, to the second audio signal AS2 so that the sound pressure level of the second sound (Sound 2) is increased and possibly maximized in a direction corresponding to an angle of about 100 degrees to about 120 degrees with respect to a forward region in front of the display panel 100. Therefore, the display apparatus may output a sound having directivity through constructive interference and destructive interference between sound waves output from the plurality of sound output modules 300-1 to 300-n.

Therefore, the display apparatus according to the present disclosure may output a plurality of sounds respectively corresponding to a plurality of images displayed in different directions, in order for the plurality of sounds to respectively concentrate in the same directions as the plurality of images. Also, the display apparatus according to the present disclosure may apply a direction focusing weight to each of a plurality of audio signals synchronized with respective pieces of data of a plurality of images displayed in different directions, thereby allowing a plurality of sounds to concentrate in different directions.

A display apparatus according to an embodiment of the present disclosure will be described below.

A display apparatus according to an embodiment of the present disclosure includes a display panel configured to display a first image in a first direction and configured to display a second image in a second direction, wherein the second direction is different from the first direction; a sound output unit including a plurality of sound output modules on a portion of the display panel to output a sound; and a sound focusing unit configured to receive first and second audio signals respectively synchronized with video data signals of the first image and the second image, configured to apply a direction focusing weight, corresponding to each of the plurality of sound output modules, to the first and second audio signals, and configured to provide each of the plurality of sound output modules with a sound signal having the direction focusing weight applied thereto, wherein the sound output unit is configured to receive the sound signal corresponding to each of the plurality of sound output modules, to output a first sound corresponding to the first image in the first direction, and to output a second sound corresponding to the second image in the second direction.

In the display apparatus according to the present disclosure, the direction focusing weight may include a first direction focusing weight and a second direction focusing weight, the sound focusing unit may apply the first direction focusing weight, corresponding to each of the plurality of sound output modules, to the first audio signal, and apply the second direction focusing weight, corresponding to each of the plurality of sound output modules, to the second audio signal, thereby generating the sound signal corresponding to each of the plurality of sound output modules In the display apparatus according to the present disclosure, the direction focusing weight may include a first direction focusing weight and a second direction focusing weight, the sound focusing unit may be configured to apply the first direction focusing weight so that sounds output from the plurality of sound output modules generate constructive interference in the first direction and generate destructive interference in a direction other than the first direction, based on the first audio signal, and the sound focusing unit may be configured to apply the second direction focusing weight so that the sounds output from the plurality of sound output modules generate constructive interference in the second direction and generate destructive interference in a direction other than the second direction based on the second audio signal.

In the display apparatus according to the present disclosure, the direction focusing weight may include a first direction focusing weight and a second direction focusing weight, the sound focusing unit may convolute a phase pulse adjusted differently for each of the plurality of sound output modules to each of the first and second audio signals, thereby respectively applying the first and second direction focusing weights to the first and second audio signals.

In the display apparatus according to the present disclosure, the sound focusing unit may be configured to determine a frequency of the phase pulse, based on a distance between adjacent sound output modules, an arrangement of the plurality of sound output modules, and the first and second directions.

In the display apparatus according to the present disclosure, the sound focusing unit may include a frequency domain conversion module configured to perform a Fast Fourier Transform (FFT) to convert each of the first and second audio signals into a signal of a frequency band; a weight application module configured to convolute a phase pulse determined differently for each of the plurality of sound output modules to each of the first and second audio signals, thereby respectively applying first and second direction focusing weights to the first and second audio signals of the frequency band; and a time domain conversion module configured to perform an Inverse Fast Fourier Transform (IFFT) on a frequency component with the first and second direction focusing weights applied thereto to generate a sound signal in the time domain.

In the display apparatus according to the present disclosure, the sound focusing unit may be configured to combine signals of the time domain with the first and second direction focusing weights applied thereto to generate the sound signal corresponding to each of the plurality of sound output modules.

In the display apparatus according to the present disclosure, the sound output unit may include n (where n is a natural number equal to or more than two) number of sound output modules, and the sound focusing unit may apply direction focusing weights $W_{11}$ to $W_{1n}$ and $W_{21}$ to $W_{2n}$, based on each of the n sound output modules according to Equation 1, to each of the first and second audio signals, $$\begin{aligned} W_{11} &= M_1 e^{jw(t+\varphi 11)} & W_{21} &= M_2 e^{jw(t+\varphi 21)} \\ W_{12} &= M_1 e^{jw(t+\varphi 12)} & W_{22} &= M_2 e^{jw(t+\varphi 22)} \\ W_{13} &= M_1 e^{jw(t+\varphi 13)} & W_{23} &= M_2 e^{jw(t+\varphi 23)} \\ &\vdots & &\vdots \\ W_{1n} &= M_1 e^{jw(t+\varphi 1n)} & W_{2n} &= M_2 e^{jw(t+\varphi 2n)} \end{aligned} \qquad \text{Equation 1}$$

where $W_{1k}$ is a first direction focusing weight, corresponding to a kth sound output module, of the first audio signal, $W_{2k}$ is a second direction focusing weight, corresponding to the kth sound output module, of the second audio signal, $M_1$ is amplitude of the first direction focusing weight, $M_2$ is amplitude of the second direction focusing weight, $\varphi 1k$ is a time shift corresponding to the kth sound output module, of the first audio signal, and $\varphi 2k$ is a time shift corresponding to the kth sound output module, of the second audio signal, where k is a natural number from one to n.

In the display apparatus according to the present disclosure, while the first image is being displayed in the first direction and the second image is being displayed in the second direction, the sound output unit may output the first sound in the first direction and outputs the second sound in the second direction.

In the display apparatus according to the present disclosure, the plurality of sound output modules may be arranged in one row in a periphery of the display panel, and adjacent sound output modules of the plurality of sound output modules may maintain the same interval therebetween.

A display apparatus according to an embodiment of the present disclosure includes a display panel configured to display a first image in a first direction and configured to display a second image in a second direction, wherein the second direction is different from the first direction; a sound output unit including a plurality of sound output modules on a portion of the display panel to output a sound; a sound position detector configured to detect a distance between adjacent sound output modules and an arrangement of the plurality of sound output modules; and a sound focusing unit configured to receive first and second audio signals respectively synchronized with video data signals of the first image and the second image, applying a direction focusing weight, corresponding to each of the plurality of sound output modules, to the first and second audio signals, and providing each of the plurality of sound output modules with a sound signal having the direction focusing weight applied thereto, wherein the sound output unit outputs a first sound corresponding to the first image in the first direction and outputs a second sound corresponding to the second image in the second direction.

In the display apparatus according to the present disclosure, the sound focusing unit may be configured to receive distance and arrangement information about the plurality of sound output modules from the sound position detector, and determine a phase pulse corresponding to each of the plurality of sound output modules, thereby determining first and second direction focusing weights of the direction focusing weight.

In the display apparatus according to the present disclosure, the direction focusing weight may include a first direction focusing weight and a second direction focusing weight, the sound focusing unit may be configured to apply the first direction focusing weight, corresponding to each of the plurality of sound output modules, to the first audio signal, and may be configured to apply the second direction focusing weight, corresponding to each of the plurality of sound output modules, to the second audio signal, thereby generating the sound signal corresponding to each of the plurality of sound output modules In the display apparatus according to the present disclosure, the direction focusing weight may include a first direction focusing weight and a second direction focusing weight, the sound focusing unit may be configured to apply the first direction focusing weight so that sounds output from the plurality of sound output modules generate constructive interference in the first direction and generate destructive interference in a direction other than the first direction, based on the first audio signal, and the sound focusing unit may be configured to apply the second direction focusing weight so that the sounds output from the plurality of sound output modules generate constructive interference in the second direction and generate destructive interference in a direction other than the second direction based on the second audio signal.

In the display apparatus according to the present disclosure, the direction focusing weight may include a first direction focusing weight and a second direction focusing weight, the sound focusing unit may convolute a phase pulse adjusted differently for each of the plurality of sound output modules to each of the first and second audio signals, thereby respectively applying the first and second direction focusing weights to the first and second audio signals.

In the display apparatus according to the present disclosure, the sound focusing unit may be configured to determine a frequency of the phase pulse, based on a distance between adjacent sound output modules, an arrangement of the plurality of sound output modules, and the first and second directions.

In the display apparatus according to the present disclosure, the sound focusing unit may include a frequency domain conversion module configured to perform a Fast Fourier Transform (FFT) to convert each of the first and second audio signals into a signal of a frequency band; a weight application module configured to convolute a phase pulse determined differently for each of the plurality of sound output modules to each of the first and second audio signals, thereby respectively applying first and second direction focusing weights to the first and second audio signals of the frequency band; and a time domain conversion module configured to perform an Inverse Fast Fourier Transform (IFFT) on a frequency component with the first and second direction focusing weights applied thereto to generate a sound signal in the time domain.

In the display apparatus according to the present disclosure, the sound focusing unit may be configured to combine signals of the time domain with the first and second direction focusing weights applied thereto to generate the sound signal corresponding to each of the plurality of sound output modules.

In the display apparatus according to the present disclosure, the sound output unit may include n (where n is a natural number equal to or more than two) number of sound output modules, and the sound focusing unit may apply direction focusing weights $W_{11}$ to $W_{1n}$ and $W_{21}$ to $W_{2n}$, based on each of the n sound output modules according to Equation 1, to each of the first and second audio signals, $$W_{11} = M_1 e^{jw(t+\varphi 11)} \quad W_{21} = M_2 e^{jw(t+\varphi 21)}$$
$$W_{12} = M_1 e^{jw(t+\varphi 12)} \quad W_{22} = M_2 e^{jw(t+\varphi 22)}$$
$$W_{13} = M_1 e^{jw(t+\varphi 13)} \quad W_{23} = M_2 e^{jw(t+\varphi 23)}$$
$$\vdots \qquad \qquad \vdots$$
$$W_{1n} = M_1 e^{jw(t+\varphi 1n)} \quad W_{2n} = M_2 e^{jw(t+\varphi 2n)}$$

Equation 1 where $W_{1k}$ is a first direction focusing weight, corresponding to a kth sound output module, of the first audio signal, $W_{2k}$ is a second direction focusing weight, corresponding to the kth sound output module, of the second audio signal, $M_1$ is amplitude of the first direction focusing weight, $M_2$ is amplitude of the second direction focusing weight, $\varphi 1k$ is a time shift corresponding to the kth sound output module, of the first audio signal, and $\varphi 2k$ is a time shift corresponding to the kth sound output module, of the second audio signal, where k is a natural number from one to n.

In the display apparatus according to the present disclosure, while the first image is being displayed in the first direction and the second image is being displayed in the second direction, the sound output unit may output the first sound in the first direction and outputs the second sound in the second direction.

In the display apparatus according to the present disclosure, the plurality of sound output modules may be arranged in one row in a periphery of the display panel, and adjacent sound output modules of the plurality of sound output modules may maintain a same interval therebetween.

It will be apparent to those skilled in the art that various modifications and variations can be made in the display apparatus of the present disclosure without departing from the technical idea or scope of the disclosures. Thus, it is intended that the present disclosure covers the modifications and variations of this disclosure provided they come within the scope of the appended claims and their equivalents.

What is claimed is:

1. A display apparatus, comprising:
a display panel configured to display a first image in a first direction and configured to display a second image in a second direction, wherein the second direction is different from the first direction;
a plurality of sound output modules on a portion of the display panel to output a sound; and
a sound focusing circuit configured to receive first and second audio signals respectively synchronized with video data signals of the first image and the second image, configured to apply a direction focusing weight, corresponding to each of the plurality of sound output modules, to the first and second audio signals, and configured to provide each of the plurality of sound output modules with a sound signal having the direction focusing weight applied thereto,
wherein the plurality of sound output modules is configured to receive the sound signal corresponding to each of the plurality of sound output modules, to output a first sound corresponding to the first image in the first direction, and to output a second sound corresponding to the second image in the second direction, wherein the direction focusing weight includes a first direction focusing weight and a second direction focusing weight, and the sound focusing circuit is configured to convolute a phase pulse determined differently for each of the plurality of sound output modules to each of the first and second audio signals, thereby respectively applying the first and second direction focusing weights to the first and second audio signals.

2. The display apparatus of claim 1, wherein the sound focusing circuit applies the first direction focusing weight, corresponding to each of the plurality of sound output modules, to the first audio signal, and applies the second direction focusing weight, corresponding to each of the plurality of sound output modules, to the second audio signal, thereby generating the sound signal corresponding to each of the plurality of sound output modules.

3. The display apparatus of claim 1, wherein:
the sound focusing circuit is configured to apply the first direction focusing weight so that sounds output from the plurality of sound output modules generate constructive interference in the first direction and generate destructive interference in a direction other than the first direction based on the first audio signal, and
the sound focusing circuit is configured to apply the second direction focusing weight so that the sounds output from the plurality of sound output modules generate constructive interference in the second direction and generate destructive interference in a direction other than the second direction based on the second audio signal.

4. The display apparatus of claim 1, wherein the sound focusing circuit is configured to determine a frequency of the phase pulse, based on a distance between adjacent sound output modules of the plurality of sound output modules, an arrangement of the plurality of sound output modules, and the first and second directions.

5. The display apparatus of claim 1, wherein the sound focusing circuit comprises:
a frequency domain conversion module configured to perform a Fast Fourier Transform (FFT) to convert each of the first and second audio signals into a signal of a frequency band;
a weight application module configured to convolute the phase pulse determined differently for each of the plurality of sound output modules to each of the first and second audio signals, thereby respectively applying the first and second direction focusing weights to the first and second audio signals of the frequency band; and
a time domain conversion module configured to perform an Inverse Fast Fourier Transform (IFFT) on a frequency component with the first and second direction focusing weights applied thereto to generate a signal in the time domain.

6. The display apparatus of claim 5, wherein the sound focusing circuit is configured to combine signals of the time domain with the first and second direction focusing weights applied thereto to generate the sound signal corresponding to each of the plurality of sound output modules.

7. The display apparatus of claim 1, wherein:
the plurality of sound output modules comprises n number of sound output modules, where n is a natural number equal to or more than two, and the sound focusing circuit applies direction focusing weights $W_{11}$ to $W_{1n}$ and $W_{21}$ to $W_{2n}$, which it calculates for each of the n sound output modules according to Equation 1, to each of the first and second audio signals, $$W_{11} = M_1 e^{jw(t+\varphi 11)} \quad W_{21} = M_2 e^{jw(t+\varphi 21)}$$
$$W_{12} = M_1 e^{jw(t+\varphi 12)} \quad W_{22} = M_2 e^{jw(t+\varphi 22)}$$
$$W_{13} = M_1 e^{jw(t+\varphi 13)} \quad W_{23} = M_2 e^{jw(t+\varphi 23)}$$
$$\vdots \quad\quad\quad \vdots$$
$$W_{1n} = M_1 e^{jw(t+\varphi 1n)} \quad W_{2n} = M_2 e^{jw(t+\varphi 2n)}$$

Equation 1 where $W_{1k}$ is a first direction focusing weight, corresponding to a kth sound output module, of the first audio signal, $W_{2k}$ is a second direction focusing weight, corresponding to the kth sound output module, of the second audio signal, $M_1$ is amplitude of the first direction focusing weight, $M_2$ is amplitude of the second direction focusing weight, $\varphi 1k$ is a time shift corresponding to the kth sound output module, of the first audio signal, and $\varphi 2k$ is a time shift corresponding to the kth sound output module, of the second audio signal, where k is a natural number from one to n.

8. The display apparatus of claim 1, wherein, while the first image is being displayed in the first direction and the second image is being displayed in the second direction, the plurality of sound output modules outputs the first sound in the first direction and outputs the second sound in the second direction.

9. The display apparatus of claim 1, wherein the plurality of sound output modules are arranged in one row in a periphery of the display panel, and adjacent sound output modules of the plurality of sound output modules maintain the same interval therebetween.

10. The display apparatus of claim 1, wherein the display panel is configured to display the first image to a person in a driver seat and is configured to display the second image to a person in a passenger seat or another seat.

11. A display apparatus, comprising:
a display panel configured to display a first image in a first direction and configured to display a second image in a second direction, wherein the second direction is different from the first direction;
a plurality of sound output modules on a portion of the display panel to output a sound;
a sound position detector configured to detect a distance between adjacent sound output modules of the plurality of sound output modules and an arrangement of the plurality of sound output modules; and
a sound focusing circuit configured to receive first and second audio signals respectively synchronized with video data signals of the first image and the second image, configured to apply a direction focusing weight, corresponding to each of the plurality of sound output modules, to the first and second audio signals, and configured to provide each of the plurality of sound output modules with a sound signal having the direction focusing weight applied thereto,
wherein the plurality of sound output modules outputs a first sound corresponding to the first image in the first direction and outputs a second sound corresponding to the second image in the second direction.

12. The display apparatus of claim 11, wherein the sound focusing circuit is configured to receive distance and arrangement information about the plurality of sound output modules from the sound position detector, and determine a phase pulse corresponding to each of the plurality of sound output modules, thereby determining first and second direction focusing weights of the direction focusing weight.

13. The display apparatus of claim 11, wherein the direction focusing weight includes a first direction focusing weight and a second direction focusing weight, the sound focusing circuit is configured to apply the first direction focusing weight, corresponding to each of the plurality of sound output modules, to the first audio signal, and is configured to apply the second direction focusing weight, corresponding to each of the plurality of sound output modules, to the second audio signal, thereby generating the sound signal corresponding to each of the plurality of sound output modules.

14. The display apparatus of claim 11, wherein:
the direction focusing weight includes a first direction focusing weight and a second direction focusing weight,
the sound focusing circuit is configured to apply the first direction focusing weight so that sounds output from the plurality of sound output modules generate constructive interference in the first direction and generate destructive interference in a direction other than the first direction based on the first audio signal, and
the sound focusing circuit is configured to apply the second direction focusing weight so that the sounds output from the plurality of sound output modules generate constructive interference in the second direction and generate destructive interference in a direction other than the second direction based on the second audio signal.

15. The display apparatus of claim 11, wherein the direction focusing weight includes a first direction focusing weight and a second direction focusing weight, the sound focusing circuit is configured to convolute a phase pulse adjusted differently for each of the plurality of sound output modules to each of the first and second audio signals, thereby respectively applying the first and second direction focusing weights to the first and second audio signals.

16. The display apparatus of claim 15, wherein the sound focusing circuit is configured to determine a frequency of the phase pulse, based on a distance between adjacent sound output modules of the plurality of sound output modules, an arrangement of the plurality of sound output modules, and the first and second directions.

17. The display apparatus of claim 11, wherein the sound focusing circuit comprises:
a frequency domain conversion module configured to perform a Fast Fourier Transform (FFT) to convert each of the first and second audio signals into a signal of a frequency band;
a weight application module configured to convolute a phase pulse determined differently for each of the plurality of sound output modules to each of the first and second audio signals, thereby respectively applying first and second direction focusing weights to the first and second audio signals of the frequency band; and
a time domain conversion module configured to perform an Inverse Fast Fourier Transform (IFFT) on a frequency component with the first and second direction focusing weights applied thereto to generate a signal in the time domain.

18. The display apparatus of claim 17, wherein the sound focusing circuit is configured to combine signals of the time domain with the first and second direction focusing weights applied thereto to generate the sound signal corresponding to each of the plurality of sound output modules.

19. The display apparatus of claim 11, wherein:
the plurality of sound output modules comprises n number of sound output modules, where n is a natural number equal to or more than two, and
the sound focusing circuit applies direction focusing weights $W_{11}$ to $W_{1n}$ and $W_{21}$ to $W_{2n}$, based on each of the n sound output modules according to Equation 1, to each of the first and second audio signals, $$W_{11} = M_1 e^{jw(t+\varphi 11)} \quad W_{21} = M_2 e^{jw(t+\varphi 21)} \qquad \text{Equation 1}$$
$$W_{12} = M_1 e^{jw(t+\varphi 12)} \quad W_{22} = M_2 e^{jw(t+\varphi 22)}$$
$$W_{13} = M_1 e^{jw(t+\varphi 13)} \quad W_{23} = M_2 e^{jw(t+\varphi 23)}$$
$$\vdots \qquad\qquad \vdots$$
$$W_{1n} = M_1 e^{jw(t+\varphi 1n)} \quad W_{2n} = M_2 e^{jw(t+\varphi 2n)}$$

where $W_{1k}$ is a first direction focusing weight, corresponding to a kth sound output module, of the first audio signal, $W_{2k}$ is a second direction focusing weight, corresponding to the kth sound output module, of the second audio signal, $M_1$ is amplitude of the first direction focusing weight, $M_2$ is amplitude of the second direction focusing weight, $\varphi 1k$ is a time shift corresponding to the kth sound output module, of the first audio signal, and $\varphi 2k$ is a time shift corresponding to the kth sound output module, of the second audio signal, where k is a natural number from one to n.

20. The display apparatus of claim 11, wherein, while the first image is being displayed in the first direction and the second image is being displayed in the second direction, the plurality of sound output modules outputs the first sound in the first direction and outputs the second sound in the second direction.

21. The display apparatus of claim 11, wherein the plurality of sound output modules are arranged in one row in a periphery of the display panel, and adjacent sound output modules of the plurality of sound output modules maintain a same interval therebetween.

22. The display apparatus of claim 11, wherein the display panel is configured to display the first image to a person in a driver seat and is configured to display the second image to a person in a passenger seat or another seat.

* * * * *